United States Patent
Wu et al.

(10) Patent No.: US 8,667,516 B2
(45) Date of Patent: Mar. 4, 2014

(54) OPTICAL DISK DRIVE WITH A CABLE PROTECTION DEVICE

(71) Applicant: Quanta Storage Inc., Taoyuan County (TW)

(72) Inventors: Jen-Chen Wu, Taoyuan County (TW); Yu-Sheng Wang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 0 days.

(21) Appl. No.: 13/650,120

(22) Filed: Oct. 11, 2012

(65) Prior Publication Data

US 2013/0254784 A1 Sep. 26, 2013

(30) Foreign Application Priority Data

Mar. 20, 2012 (CN) .......................... 2012 1 0073785

(51) Int. Cl.
*G11B 33/12* (2006.01)
*G11B 17/04* (2006.01)

(52) U.S. Cl.
USPC .......................................... 720/652; 720/601

(58) Field of Classification Search
USPC .......................... 720/600–603, 606, 648–654
See application file for complete search history.

(56) References Cited

U.S. PATENT DOCUMENTS

| 6,160,780 A * | 12/2000 | Furukawa et al. ............ 720/604 |
| 7,234,149 B2 * | 6/2007 | Takahashi et al. ............ 720/601 |
| 2010/0032203 A1 * | 2/2010 | Ou et al. ...................... 174/480 |

* cited by examiner

*Primary Examiner* — Nathan Danielsen
(74) *Attorney, Agent, or Firm* — Winston Hsu; Scott Margo

(57) ABSTRACT

An optical disk drive is disclosed to fix a main board in the casing and a second board under the tray. A flat cable on the bottom of the casing connects the main board with one end, and forms a bent portion to connect the connector of the second board at the other end. A cable protection device close to the connector is fixed under the tray to face the bent portion with an incline for preventing the bent portion from bending.

7 Claims, 5 Drawing Sheets

OPTICAL DISK DRIVE WITH A CABLE PROTECTION DEVICE

BACKGROUND OF THE INVENTION

1. Field of the Invention

The invention relates to an optical disc drive, and more specifically, to an optical disc drive with a flat cable connected to a tray and a main board, capable of protecting the flat cable and increasing service life of the flat cable.

2. Description of the Prior Art

A slim flat cable is used for connecting and transmitting signals and electricity between electronic components on a tray and a main board of a tray-type optical disc drive. The flat cable is loaded and unloaded with the tray, and it needs to bear pushing and folding deformation back and forth for a long time, so that the optical disc drive can operate stably.

Please refer to FIG. 1. FIG. 1 is a sectional view of an optical disc drive 10 in the prior art. A main board 12 is fixed on a back end of a casing 11, and a tray 13 is disposed inside the tray 13 for supporting a spindle motor 14 to rotate a disc 15. A second board 16 with electronic components is disposed under the tray 13 for serving the spindle motor 14. A bottom of the second board 16 is covered with a metal plate 18 for isolating electromagnetic interference. A flat cable 17 is fixed on a bottom of the casing 11 in a foldable manner. An end of the flat cable 17 is connected to the main board 12, and the other end of the flat cable 17 is connected with a connector 19 of the second board 16. The flat cable 17 is moving in and out of the casing 11 with the tray 13 for providing transmission of electricity and signals between the main board 12 and the second board 16. As the optical disc drive 10 becomes slimmer, a flat cable 17' is lifted up by a slimmed casing 11' and is pressed between the slimmed casing 11' and the metal plate 18. After the tray 13 is moving into the casing 11', a bent portion 17a at an end of the flat cable 17' is bent sharply. A crease is easily formed by pressing and folding the flat cable 17' for a long time, resulting in fracture of the flat cable 17'. Therefore, a slimmed optical disc drive 10 needs to provide more space for the bent portion 17a of the flat cable 17' to form a curve portion 17b by elasticity of the flat cable 17', so as to increase a bending angle of the bent portion 17a to prevent the flat cable 17' from fracturing.

However, when the end of the flat cable 17' is connected with the connector 19 to form the curve portion 17b, the flat cable 17' is overbending relative to the connector 19. When the flat cable 17' is moving in and out of the casing 11' and moving back and forth between a loose state and a tight state of forming the curve portion 17b, it is easy to fracture the flat cable 17' after the flat cable 17' is bent for a long time, so that the flat cable 17' cannot provide the optical disc drive 10 with stability of operation. Therefore, there are problems to be solved about protecting the flat cable 17' in the slimmed optical disc drive 10 in the prior art.

SUMMARY OF THE INVENTION

A purpose of the present invention is to provide an optical disc drive with an incline near a connector of a second board to guide a bent portion of a flat cable to form a curve portion, for preventing the flat cable from overbending to affect service life of the flat cable.

Another purpose of the present invention is to provide an optical disc drive to integrally form an incline with a tray to simplify structure of a cable protection device. The incline is near the connector of the second board.

Another purpose of the present invention is to provide an optical disc drive to integrally form an incline with a tray, and a rear terminal part of the tray can be cut off to end off the tray with a rear side surface, so as to increase space for a bent portion of the flat cable.

In order to achieve above purposes, the optical disc drive of the present invention includes a casing, a main board, a tray, a second board, a flat cable and a cable protection. The main board is fixed on a back end of the casing. The tray is slidably moving in and out of the casing. The second board is disposed under the tray covered with a metal plate, and a connector is disposed on the second board. The flat cable is fixed on a bottom of the casing. An end of the flat cable is connected to the main board and the other end of the flat cable forming a bent portion to connect with the connector of the second board. The cable protection device is fixed under the tray and close to the connector. The cable protection device includes an incline facing the bent portion. A distance between the incline, slanting from an end near the connector toward a rear side of the optical disc drive, and the bottom of the casing is gradually increasing.

An acute angle is formed between the incline and a backward horizontal axis of the optical disc drive. The cable protection device of the present invention can be a step structure protruding from the tray toward the bottom of the casing. Or a rear terminal part of the tray can be cut off to end off the tray with a rear side surface. A flange of the metal plate is near the connector of the second board and protrudes along the rearward direction of the optical disc drive to clip the flat cable with the incline, so as to prevent the flat cable from overbending.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
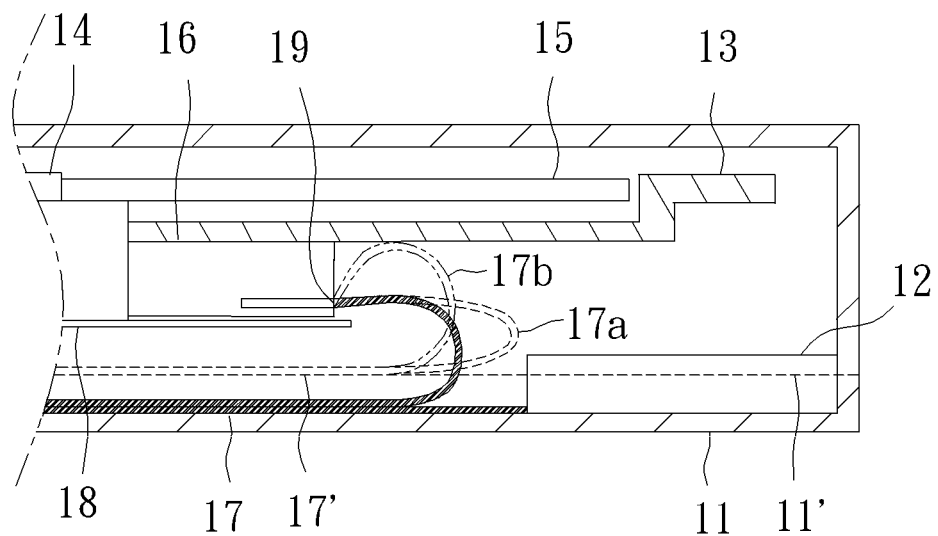
FIG. 1 is a sectional view of an optical disc drive in the prior art.
Figure 2:
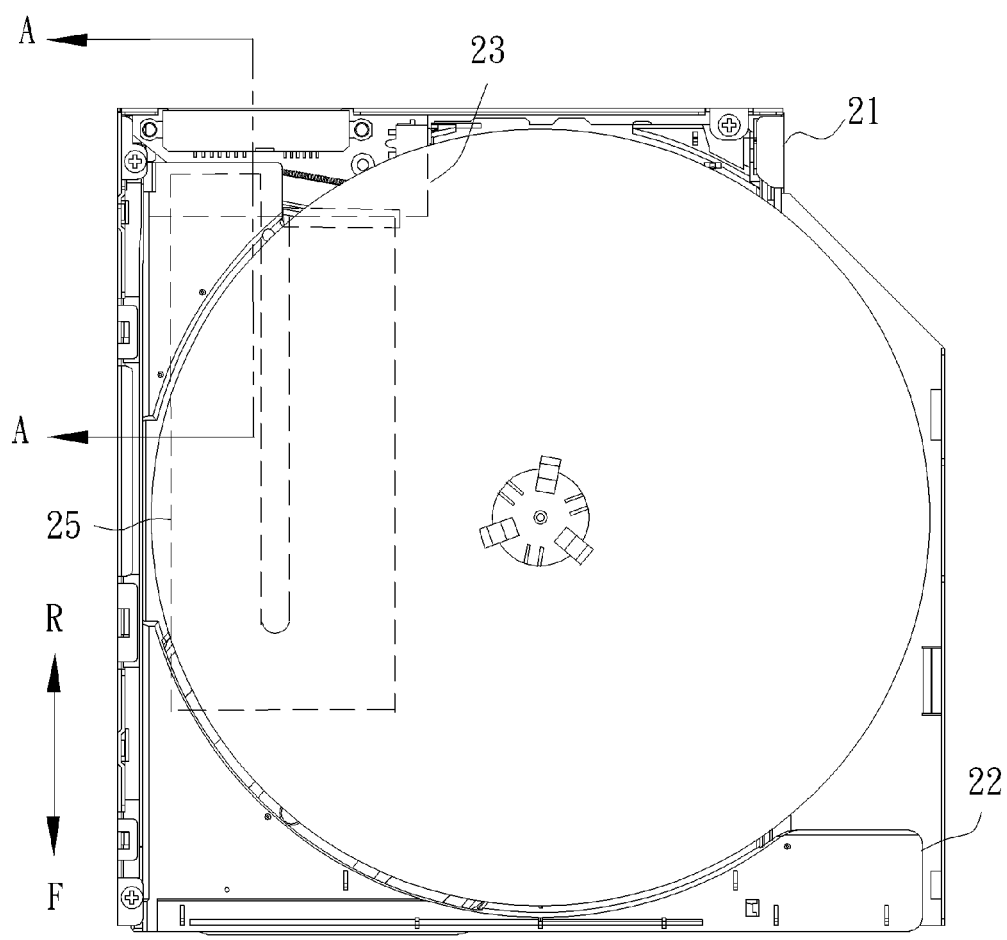
FIG. 2 is a diagram of an optical disc drive according to a first embodiment of the present invention.
Figure 3:
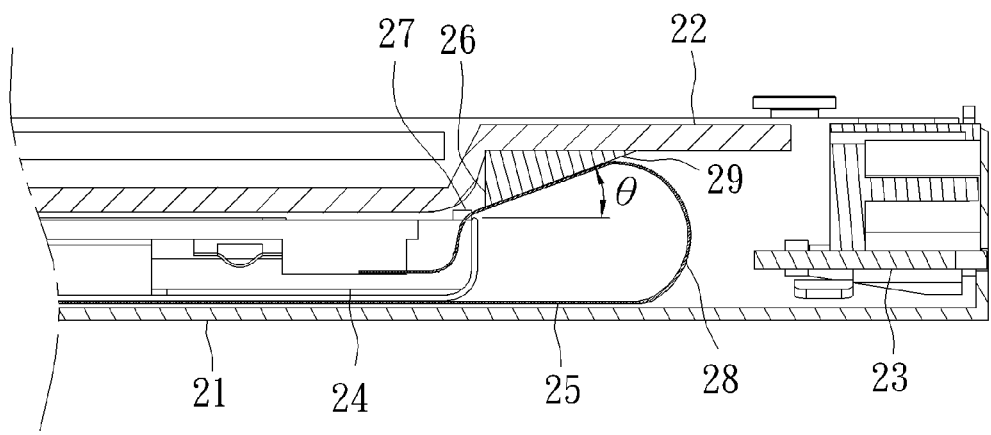
FIG. 3 is a sectional view of the optical disc drive along line A-A illustrated in FIG. 2 according to the first embodiment of the present invention.

Please refer to FIG. 2 and FIG. 3. FIG. 2 is a diagram of an optical disc drive 20 according to a first embodiment of the present invention. FIG. 3 is a sectional view of the optical disc drive 20 along line A-A illustrated in FIG. 2 according to the first embodiment of the present invention. The optical disc drive 20 includes a casing 21, a tray 22, a main board 23, a second board 24, a flat cable 25 and a cable protection device 26. The optical disc drive 20 can move in a forward direction F or a rearward direction R. The main board 23 is fixed on a back end of the casing 21. The tray 22 can slide in and out of the casing 21. The second board 24 is disposed under the tray 22. A connector 27 is disposed on the second board 24. The flat cable 25 is fixed on a bottom of the casing 21. An end of the flat cable 25 is connected to the main board 23, and the other end of the flat cable 25 forms a bent portion 28 to connect with the connector 27 of the second board 24.

The cable protection device 26 is fixed under the tray 22 and close to the connector 27 of the second board 24. The cable protection device 26 includes an incline 29 facing the bent portion 28 of the flat cable 25. A distance between the incline 29, slanting from an end near the connector 27 toward a rear side of the optical disc drive 20, and the bottom of the casing 21 is gradually increasing, so that the space under the tray 22 for containing the bent portion 28 is gradually increasing from the end near the connector 27 toward the rear side of the optical disc drive 20.

As the optical disc drive 20 is in operation, the tray 22 is moving into the casing 21 from outside, and the loose flat cable 25 is pressed to contact against the bottom of the casing 21, so that the bent portion 28 at a rear end of the flat cable 25 is reduced gradually. When the tray 22 is moving into the casing 21 to a position as shown in FIG. 2, the bent portion 28 is reduced to a minimum size and forms a curve portion by elasticity of the flat cable 25. The distance between the incline 29, slanting from the end near the connector 27 toward the rear side of the optical disc drive 20, and the bottom of the casing 21 is gradually increasing in the rearward direction R, and an acute angle θ is formed between the incline 29 and the rearward direction R, so that the incline 29 constrains a bending deformation of the bent portion 28 of the flat cable 25 connected with the connector 27, and the flat cable 25 is guided to contact along the incline 29 to form the curve portion. As a result, the acute angle θ of the flat cable 25 can be remained for preventing the flat cable 25 from overbending. As shown in FIG. 3, the acute angle θ can be preferably thirty degrees. In this condition, the flat cable 25 can be prevented from overbending and fracturing and can be guided to extend the bent portion 28 to form the curve portion.

In the optical disc drive 20, the cable protection device 26 can be disposed under the tray 22 and close to the connector 27 of the second board 24, so that the incline 29 can guide the bent portion 28 of the flat cable 25 to form the curve portion, so as to prevent the flat cable 25 connected with the connector 27 from overbending and fracturing to affect service life of the flat cable 25.

Figure 4:
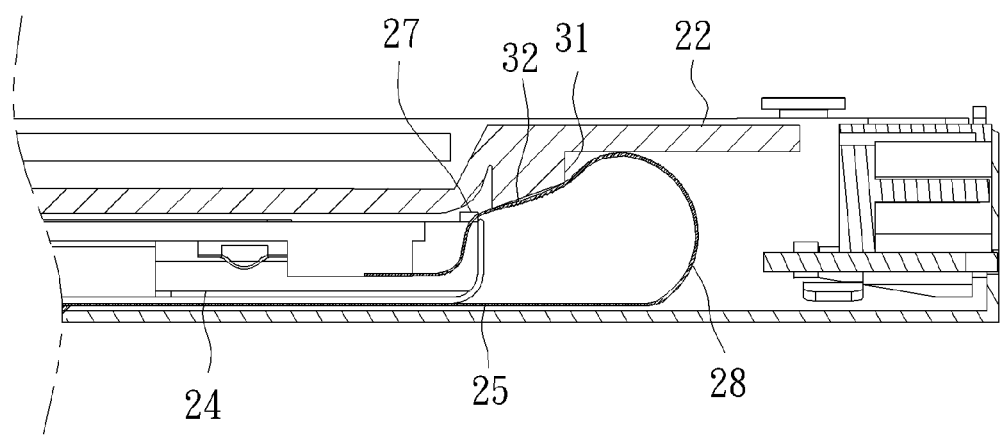
FIG. 4 is a sectional view of an optical disc drive according to a second embodiment of the present invention.

Please refer to FIG. 4. FIG. 4 is a sectional view of an optical disc drive 30 according to a second embodiment of the present invention. Basic structures of the first embodiment and the second embodiment are substantially the same. A difference between the first embodiment and the second embodiment is a cable protection device 31 in the second embodiment. For simplicity, elements that have the same functions as that illustrated in FIG. 3 are provided with the same item numbers used in FIG. 4. The tray 22 and the cable protection device 31 under the tray 22 are integrally formed, and the cable protection device 31 is close to the connector 27 of the second board 24. An incline 32 is disposed on the cable protection device 31 and faces the bent portion 28 of the flat cable 25. The incline 32 slants from an end near the connector 27 toward the rear side of the optical disc drive 30 in the rearward direction R. The incline 32 prevents the bent portion 28 of the flat cable 25 near the connector 27 from overbending. Because the tray 22 and the incline 32 are integrally formed, it can not only simplify manufacture and structure of the cable protection device 31 and but also enhance structural strength of the cable protection device 31. Therefore, the cable protection device 31 can be a step structure protruding from the tray 22, so as to shorten a length of the cable protection device 31 to increase the space under the tray 22 for containing the bent portion 28. Hence, the bent portion 28 can be formed as a bigger curve portion to prevent the flat cable 25 from pressing and fracturing.

Figure 5:
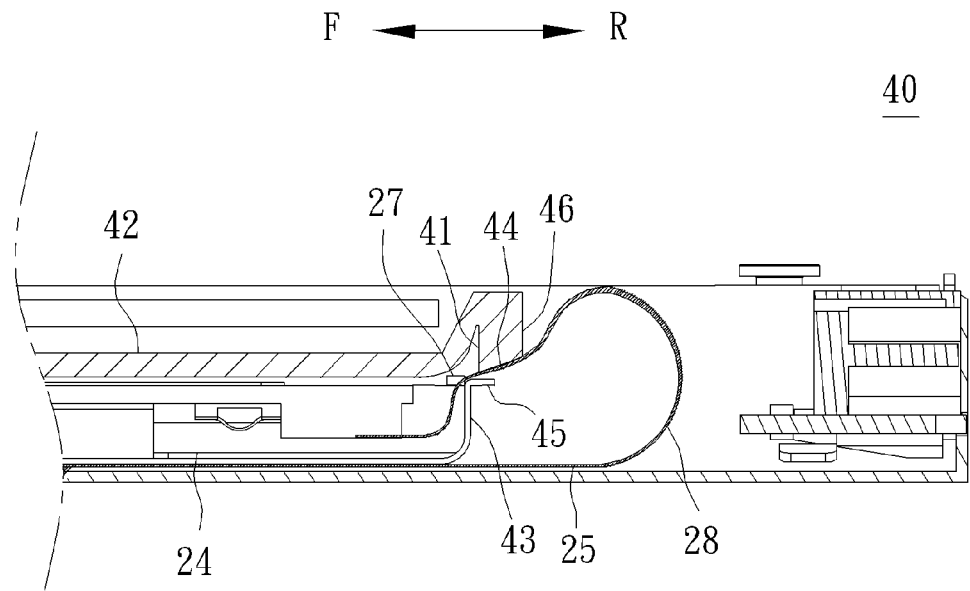
FIG. 5 is a sectional view of an optical disc drive according to a third embodiment of the present invention.

Please refer to FIG. 5. FIG. 5 is a sectional view of the optical disc drive 40 according to a third embodiment of the present invention. Basic structures of the first embodiment and the third embodiment are substantially the same. Differences between the first embodiment and the third embodiment are a cable protection device 41, a tray 42 and a metal plate 43 in the third embodiment. For simplicity, elements that have the same functions as that illustrated in FIG. 3 are provided with the same item numbers used in FIG. 5. In the third embodiment, the cable protection device 41 under the tray 42 and the tray 42 are integrally formed, and the cable protection device 41 is close to the connector 27 of the second board 24. An incline 44 is disposed on the cable protection device 41 and faces the bent portion 28 of the flat cable 25. A bottom of the tray 42 is covered with the metal plate 43. A flange 45 of the metal plate 43 is near the connector 27 of the second board 24 and protrudes along the rearward direction R of the optical disc drive 40 to clip the flat cable 25 with the incline 44 within the acute angle θ, so as to prevent the flat cable 25 near the connector 27 from overbending. Besides, the flange 45 also can protrude obliquely, instead of protruding along the rearward direction R horizontally, to achieve a purpose of preventing the flat cable 25 from overbending by cooperation with the incline 44. The cable protection device 41 is connected to a rear terminal end of the tray 42, that is, a rear terminal part of the tray 42 can be cut off to end off the tray 42 with a rear side surface 46, so as to prevent the tray 42 from pressing the flat cable 25 and to increase the space for containing the bent portion 28 to form the curve portion. As a result, a bigger curve portion is formed by the bent portion 28 to prevent the flat cable 25 from pressing and fracturing.

Therefore, in the second embodiment and the third embodiment, the cable protection device of the optical disc drive is integrally formed with the tray near the connector of the second board to simplify the structure of the optical disc drive. To shorten the length of the cable protection device or to cut off the rear terminal part of the tray can increase the space for the bent portion to prevent the flat cable from pressing and fracturing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical disc drive, comprising:
a casing;
a main board fixed on a back end of the casing;
a tray slidably moving in and out of the casing;
a second board disposed under the tray, a connector being disposed on the second board;
a flat cable fixed on a bottom of the casing, an end of the flat cable being connected to the main board and the other end of the flat cable forming a bent portion to connect with the connector; and
a cable protection device fixed under the tray and close to the connector, the cable protection device comprising an incline facing the bent portion, and a distance between the incline, slanting from an end near the connector toward a rear side of the optical disc drive, and the bottom of the casing being gradually increasing, wherein the cable protection device is a step structure protruding from the tray toward the bottom of the casing.

2. The optical disc drive of claim 1, wherein an acute angle is formed between the incline and a rearward direction of the optical disc drive.

3. The optical disc drive of claim 2, wherein the acute angle is substantially 30 degrees.

4. The optical disc drive of claim 1, wherein a bottom of the tray and the cable protection device are integrally formed.

5. The optical disc drive of claim 1, wherein the cable protection device is connected to a rear terminal end of the tray.

6. The optical disc drive of claim 1, wherein a bottom of the tray is covered by a metal plate, and a flange of the metal plate is near the connector and protrudes a rearward direction of the optical disc drive to clip the flat cable with the incline, so as to prevent the flat cable from overbending.

7. The optical disc drive of claim 6, wherein the flange of the metal plate horizontally protrudes along the rearward direction of the optical disc drive.

\* \* \* \* \*